Feb. 28, 1933.  C. P. WELLMAN  1,899,173
MECHANISM FOR WEIGHING AND PACKAGING COMMODITIES
Original Filed Dec. 30, 1929
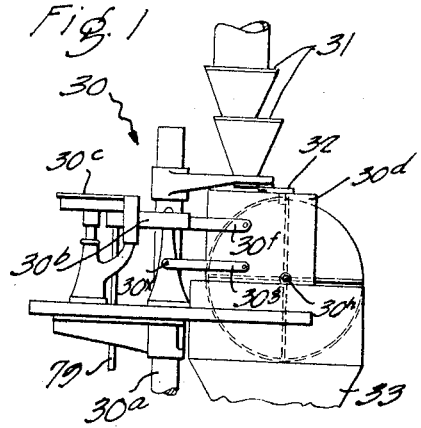
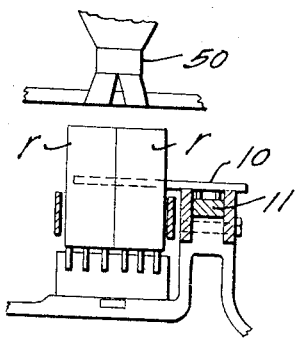
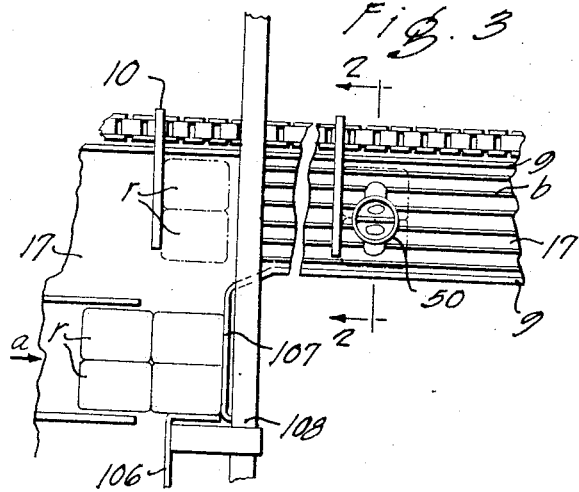
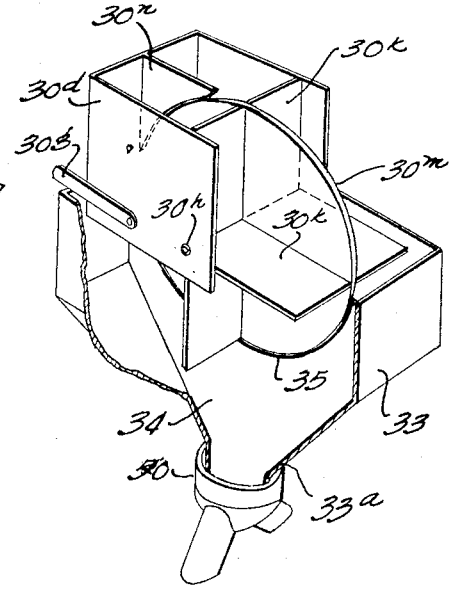
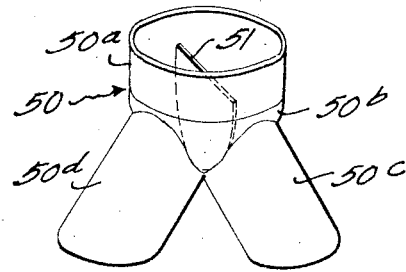
INVENTOR
CHARLES P. WELLMAN
by Roberts Cushman & Woodbury
ATT'YS Patented Feb. 28, 1933

1,899,173

UNITED STATES PATENT OFFICE

CHARLES P. WELLMAN, OF WEST MEDFORD, MASSACHUSETTS

MECHANISM FOR WEIGHING AND PACKAGING COMMODITIES

Original application filed December 30, 1929, Serial No. 417,350. Divided and this application filed July 18, 1931. Serial No. 551,628.

This application is a division of my application Serial No. 417,350 for method of and mechanism for packaging commodities, filed December 30, 1929.

This invention relates to the even division into containers of bulk commodities, for example such materials as crystalline or powdered chemical substances, grain, flour, sugar, spices, coffee, comminuted food products in general, and other merchandise sold by weight and desirably packaged in boxes, cans, bags, cartons, or other uniform receptacles, hereinafter referred to as receptacles. A receptacle typical of all others is a carton or flexibly stiff paper container, open at one end, and adapted to be closed after filling.

It is well known in the art to provide for making or for opening previously made receptacles, to convey these receptacles intermittently under the chute or feed spout of a filling device, to deliver a suitable charge, which may be automatically weighed, into each of the receptacles positioned to receive such a charge, to move the filled receptacles forward, and to close the filled package ends. This invention relates particularly to weighing charges of commodities which desirably are precisely measured and desirably precisely measured according to weight, so that there may be no variation from one receptacle to the other of the amount of its contents except well within a permitted toleration for variation of the amount of its contents, and to mechanism for weighing such charges and filling receptacles severally with the measured charges. For example with respect to one pound packages, a variation of one-sixteenth of an ounce under or over weight may be tolerated; but it is desirable that a lesser variation than 0.39 per centum, represented by this tolerance, shall be attained, since persistent underweight is unethical, and unlawful in some jurisdictions, whereas persistent overweight represents a loss to the dispenser of the commodities which, from their nature, represents a substantial proportion of the profit of the business.

Speed in the operation of filling and weighing charges into the containers is of the essence of the operation. Usually filling and weighing commodities is but one step in a series of operations having to do with opening, erecting, folding, closing, labelling, and wrapping and packing boxes or crates of the filled containers for shipment, and of all of these operations weighing and filling the charge is notoriously the slowest operation, and therefore represents a drag upon the entire operation of providing weighed filled containers, which it is one object of this invention to obviate.

This slowness of the weighing operation is primarily due to the high degree of accuracy required. Whether the weighing instrument is a scale beam, pan and weight or a spring balance, its sensitiveness to displacement by weights relatively small in proportion to the general mass of the attained weight, is measured by the time of displacement, so that scale mechanisms sensitive to percentage variations of the order of four-tenths or less of one per centum of the gross weight imply a necessary time to be displaced, after reaching a balanced state, varying with the gross mass to be displaced by gravity. Scale mechanisms capable of weighing one pound within the suggested limit of accuracy require, for example, more than one second and often more than two seconds for filling to weight and response to attained weight; whereas the adjuvant handling mechanism is quite capable of operating at speeds at or in excess of sixty packages per minute.

This has led inevitably to reduplicating the weighing mechanism, so that a supply of receptacles to be filled may be divided between two or more mechanisms; for example, the patent to Charles L. Bond, No. 1,729,991 dated October 1, 1929, for carton filling machine, describes and claims duplicate filling and weighing mechanisms to serve at the same time two streams of conveyed receptacles. In certain aspects, this invention has for one of its objects an improvement on the weighing mechanism of the said patent, which may be consulted for parts and combinations retained unchanged, and not necessary to be here specifically described.

One object of this invention is to provide for filling measured charges into receptacles in such a way as to provide for filling to a predetermined weight each of a plurality of receptacles by mechanism capable of gauging the amount of the commodity as accurately as the severally-acting or multiple weighing mechanisms heretofore resorted to, and at a higher speed; another object of the invention is to increase the total mass weighed at one weighing operation by performing the weighing operation before filling, for more than one receptacle at once; and another object of the invention is to provide for filling and weighing receptacles within a predetermined degree of accuracy in the mass of the contents of each at a higher rate than heretofore, having regard to the number of weighing operations performed, and the number of filled receptacles delivered in a unit of time.

In its aspect as a machine, this invention is applicable to and provides for the improved operation of filling and weighing machines of the kind known as net weighing machines adapted for weighing the charge to be inserted in the receptacle and then inserting it.

The invention will now be explained with the aid of a specific instance only, presented by way of illustration and shown in the accompanying drawing, in which Fig. 1 is a rear elevation illustrating the feeding and weighing devices of a filling and net weighing machine according to the invention;

Fig. 2 is a vertical section in a plane at right angles to the plane of Fig. 1 on the line 2—2 of Fig. 3, showing conveying devices suitable for use with the devices of Fig. 1;

Fig. 3 is a plan view above the table of a filling and net weighing machine illustrating receptacle transfer and conveying mechanism suitable for use in the devices of Figs. 1 and 2;

Fig. 4 is a detail perspective illustrating a preferred type of net weighing feeding device; and Fig. 5 is a perspective illustrating a bifurcated commodity feed delivery device of one kind recommended to be employed with the devices of Figs. 1 and 3.

In Figs. 1, 2, 3 and 4, I have shown a machine in which the feed table 17 and conveyor device 11, together with the means for actuating the same, may be substantially the same as that in said Bond patent, for example, but any controllable conveyor means may be substituted or the weighing device operated with hand-positioned receptacles. The weighing machine indicated generally at 30 weighs the charge before delivery into the receptacles $r$. Said machine may comprise standard $30^a$ on which is mounted a scale mechanism comprising a beam $30^b$, and weight pan $30^e$, the beam $30^b$ being forked to carry between its ends a casing $30^d$ for a rotating series of weighing compartments adapted to be released on downward motion of the casing $30^d$ when the counterweight on the beam $30^b$ is overcome. For example, casing $30^d$ may be a hollow structure of sheet metal defining three sides of a six-sided solid, and pivoted to beam $30^b$ at $30^f$ by the usual knife-edge bearings on lugs of the casing in holes in the scale beam $30^b$, the casing $30^d$ preferably being also supported by a forked link $30^g$ pivoted to said casing and to the scale standard at $30^x$ for parallel motion downwardly by gravity. The casing $30^d$ provides a bearing for a shaft $30^h$ rigid with vanes $30^k$ at right angles to each other. These vanes with the three walls of the casing $30^d$ form a rectangular receiver for delivery of the commodity from above through the hopper spouts 31. Each quadrant of the wheel made up of the vanes $30^k$ thus forms with casing $30^d$ a compartment, which when filled through the spout 31 tips the scale beam and is as a consequence rotated on the axis at $30^h$ to deliver its weighed load. As usual, the weighing wheel in casing $30^d$ may be released on dropping below a detent 32, Fig. 1, mounted on the lower end of the delivery spout 31.

For the purpose of filling at the same rates and simultaneously two receptacles $r$ which have been brought or placed under the delivery end of the filling device, for example by the drivers 10, the stream of material is divided evenly between the orifices of the bifurcated feed delivery device 50, Figs. 2, 3, 4 and 5, the ends of which as shown respectively deliver into the open ends of receptacles $r$.

The weighing receptacle $30^d$, $30^k$ is vertically subdivided. For example, a circular plane disk $30^m$ is erected centrally between the lateral walls of the casing $30^d$ whereupon the delivery through the spout 31 is mechanically divided between the lateral walls of the casing $30^d$ into two parts, the aggregate weight of which determines the discharge of the weighed load.

The casing $30^d$ may comprise, in the plane of the disk $30^m$, a fixed partition $30^n$.

I have found that the device of the dividing edges $30^m$ and $30^n$ is reliable to divide the feed stream, and as a consequence, the delivery streams of any commodity of the general class mentioned above into two streams, whose flow under gravity or the impulsion of the discharge apparatus in the filling device of any of the known types results in two streams in which like unit weights reliably flow during given intervals of time, within the permitted variation of mass or weight adverted to above.

One result of filling the packages in this manner is to double the production of filled packages after each pause for weighing, and to reduce the necessary delay for filling and the action of the scale beam to at most one-half the time required for weighing the contents of a charge for the packages one by one. This has been done without any decrease whatever in the accuracy of the weighing as applied to two packages, and it has been done within the permitted variation in weight of the contents of any package as compared with that of any other package. That is to say, the operation has been performed with gains represented at a minimum by these factors. In actual fact the gain is larger when the total weight available to tip the scale beam $30^b$ has been doubled, and therefore the time of swing of the scale beam at completion of the expected load also has been halved. The aggregate stream of commodity flowing to the scale is twice as great in volume and in rate; the scale will therefore operate to stop the filling stream and initiate other motions in less than half the previous time for single-charge weighing.

As usual the weighed load in the net weigher is received in a funnel hopper 33, whereupon, in order to maintain division of the weighed load and provide distribution into two or more packages, a partition 34 having a circular opening 35 may be relied upon to continue the division through the funnel hopper 33 and $33^a$ leading to the positioned receptacles. At the bottom of the funnel hopper $33^a$ the bifurcated spout 50 of Fig. 5, for example, may be placed to deliver into the receptacles $r$ respectively. Spout 50 comprises a cylindrical collar $50^a$ merging into a body $50^b$ communicating with the tubular legs $50^d$ and $50^e$, and having a thin diametrical partition 51 continuing the partition 34.

In net weighing machines in which there is automatic conveyance of empty receptacles to the place of filling, and conveyance away of the filled receptacles, empty receptacles may be advanced under the filling spouts at any times except when a stream of material is actually flowing through the delivery device 50. It is therefore satisfactory in such a machine to cause the conveyor 11 to move to advance a new pair of receptacles $r$ during the latter part of the time required to fill simultaneously the compartments of one quadrant of the receiving weigher. To this end the devices described in the said Bond patent for operating a clutch to drive a shaft 36 geared through intermittently operating gearing to a sprocket operating the conveyor chain 11 may be resorted to without change, one of the clutch releasing connections 79 in the said patent being arranged as shown in Fig. 1, to be depressed by the scale beam on upward motion of the casing $30^d$ after the delivery of a weighed load to initiate the advance of a pair of empty receptacles. Any other tripping connection might be resorted to.

In the described device, it will be apparent, the commodity feed may be continuous, but it will be understood that any or all of the mechanisms of the machine may be arranged to be automatically stopped on the occurrence of faulty operation or the absence of receptacles, or of commodity, by any usual devices.

Viewed in one aspect, the net-weighing device of this invention provides as a part of the machine an endless series of receptacles brought into position to receive divided flows of the commodity, the walls $30^k$ of which receptacles, when a predetermined aggregate weight has been reached, operate to cut off flow into said receptacles, to transfer the several charges contained therein to the packaging receptacles, and to position a new plurality of receptacles to receive further flow.

The device, if any is employed, for conveying a series of receptacles to be filled into the machine in the direction of the arrow $a$ (Fig. 3) may be any belt or other device of the prior art; the devices for intermittently conveying packages through the machine past a delivery device 50 (Figs. 2 and 3) may be the devices, without substantial change, of the said Bond Patent No. 1,729,991, which may be consulted for recommended construction and operation, and I do not herein illustrate matters corresponding to the devices of one of the duplicate sides of the illustrative machine of the said Bond patent. The table 17, for example, the receptacle driving chain 11 and drivers 10, may be substantially the same as those disclosed in said Bond patent and need not be particularly described.

Referring now to Fig. 3, empty receptacles $r$ arriving by belt conveyor, gravity chute, or other means in the direction of the arrow $a$ are delivered onto the machine table 17, and brought up against a stop 107. According to the present invention empty containers arriving at the stop 107 are transferred in groups, for example two, at a time into the path of drivers 10 on a chain 11, intermittently moved from time to time, as presently explained, in relation to the delivery into the receptacles $r$ of charges of the commodity. A transfer mechanism, comprising a reciprocating rod 108 and a driver 106 wide enough to engage the adjacent receptacle of a pair stopped against the stop 107 and long enough not to pass the end of the arriving column of receptacles $r$ and operating in one direction only of a stroke of said driver, may be constructed and operate otherwise according to the said Bond patent. The drivers 10 are long enough to contact with two receptacles side by side and are separated to a greater extent than the longitudinal dimension in the direction $a$ of the arrival of two adjacent receptacles side by side. As in said patent, the receptacles may slide on their bottoms along a way made of the upper edges of polished bars $b$ between lateral guides 9 supported and operated as in said patent.

I do not herein claim the genus common to this application, and to my said application Serial No. 417,350, filed December 30, 1929.

I claim:

1. Machine for measuring charges of commodities comprising a series of displaceable measuring receptacles to receive charges of the commodity, means for causing a flow of the commodity in a duct, means for dividing the flow and guiding the divisions severally into the receptacles, and means actuated by the attainment of a predetermined aggregate weight of the commodity in said receptacles for discharging said receptacles.

2. Machine for measuring charges of commodities comprising a series of displaceable measuring receptacles to receive charges of the commodity, means for causing a flow of the commodity in a duct, means for dividing the flow and guiding the divisions severally into receptacles of said series, and means actuated by the aggregate weight of the commodity thus delivered to receptacles of the series for causing other receptacles of the series to move into position to receive the divided flow.

3. Machine for measuring charges of commodities comprising a series of measuring receptacles to receive charges of the commodity, means for establishing a flow of the commodity in a duct, means for dividing the flow and guiding the divisions into separate receptacles of the series, and means actuated by the aggregate weight of the divisions of the commodity in said receptacles for automatically causing the divisions of said flow to accumulate severally in other receptacles of said series.

4. Machine for measuring charges of commodities having therein a series of displaceable measuring receptacles for the commodity, means for causing a flow of the commodity in a duct, means for dividing the flow and guiding the divisions severally into a plurality of said receptacles, means for causing simultaneous cessation of flow into each of said receptacles upon displacement of said receptacles, means actuated by the aggregate net weight of the received commodity for causing such displacement, and means acting as a consequence of such displacement for severally delivering the charges from said receptacles.

5. Weighing device of the kind having an induct for a flow of commodity, means for proportionately dividing the flow, a series of displaceable measuring receptacles to receive severally the divided flow, said receptacles being supported for simultaneous displacement by the aggregate weight of their contents against a predetermined measuring force, means for supporting groups of the receptacles for movement respectively out of and into the lines of flow, and means for so moving the receptacles acting as a consequence of their displacement by said aggregate weight.

6. Net weighing device for measuring charges of a commodity having therein a rotatable series of groups of receptacles for an inflowing commodity, means for filling a plurality of the receptacles simultaneously by like streams of the commodity, means for opposing rotation of said series by gravity by a predetermined force, means for causing simultaneous rotation of said series as a consequence of gravity of their received aggregate contents, and delivery ducts for receiving the weighed contents of said receptacles severally.

7. Net weighing device for measuring charges of a commodity having therein a rotatable series of groups of receptacles for an inflowing commodity, means for filling a plurality of the receptacles simultaneously by like streams of the commodity, means for opposing rotation of said series by gravity by a predetermined force, means for causing simultaneous rotation of said series as a consequence of gravity of their aggregate received contents, and delivery ducts for receiving the weighted contents of said receptacles severally, in combination with means for positioning receptacles severally to receive flows from said delivery ducts.

8. Net weighing device for measuring charges of a commodity having therein a rotatable series of groups of measuring receptacles for an inflowing commodity, means for filling a plurality of said receptacles simultaneously by like streams of the commodity, means for supporting the axis of rotation of said series for displacement by gravity against a predetermined force, means for causing rotation of said series as a consequence of displacement of said series by gravity of the commodity, and means for severally delivering the contents of each of a group of said receptacles.

9. Net weighing device for measuring charges of a commodity having therein a rotatable series of groups of measuring receptacles for an inflowing commodity, means for filling a plurality of said receptacles simultaneously by like streams of the commodity, means for supporting the axis of rotation of said series for displacement by gravity against a predetermined force, means for causing rotation of said series as a consequence of displacement of said series by gravity of the commodity, and means for severally delivering the contents of each of a group of said receptacles, in combination with means for positioning container receptacles severally to receive said deliveries.

10. Net weighing device for measuring charges of a commodity having therein a rotatable series of groups of receptacles for an inflowing commodity, means for filling a plurality of the receptacles simultaneously by like streams of the commodity, means for opposing rotation of said series by gravity by a predetermined force, means for causing rotation of said series as a consequence of gravity of their received contents, and delivery ducts for receiving the weighed contents of said receptacles severally, in combination with conveyor means adapted to be moved during filling of said receptacles for positioning container receptacles to receive the commodity from said ducts.

11. Net weighing device having a feed hopper, a delivery hopper and a weighing wheel, each of said parts divided by partitions to receive different moieties of a commodity, whereby to weigh and deliver severally an aggregate of charges separated from each other by said partitions.

12. Net weighing device having a feed hopper, a delivery hopper and a weighing wheel, each of said parts divided by partitions to receive different moieties of a commodity, whereby to weigh and deliver severally an aggregate of charges separated from each other by said partitions, in combination with conveyor means adapted simultaneously to move to receiving position under said delivery hopper a plurality of receptacles for the weighed charges delivered.

13. Net weighing device having a feed hopper, a delivery hopper and a weighing wheel, each of said parts divided by partitions to receive different moieties of a commodity, whereby to weigh and deliver severally an aggregate of charges separted from each other by said partitions, in combination with conveyor means, operating during times when said wheel is stationary, adapted simultaneously to move to receiving position under said delivery hopper a plurality of receptacles for the weighed charges delivered.

14. Net weighing device having a feed hopper, a delivery hopper and a weighing wheel, each of said parts divided by partitions to receive different moieties of a commodity, whereby to weigh and deliver severally an aggregate of charges separated from each other by said partitions, in combination with conveyor means controlled by the position of said weighing wheel adapted simultaneously to move to receiving position under said delivery hopper a plurality of receptacles for the weighed charges delivered.

15. A packaging machine having therein conveying mechanism for empty receptacles to be filled, means for establishing a flow of the material to be packaged, means for dividing the flow, means for accumulating in separate divisions a quantity of the material thus divided, means for weighing the thus acumulated material collectively, means for simultaneously stopping accumulation in said divisions when a predetermined aggregate weight is attained, and automatic means for directing the said divisions of accumulated material into respective ones of said receptacles.

16. In a packaging machine, the combination of means for effecting a flow of material in predeterminately proportional streams, means for collecting the several streams of material in separate divisions including a member displaceable by the collective action of said divisions of material, and means operating as a consequence of displacement of said member to discharge the collected divisions of material separately.

17. Machine for measuring charges of commodities comprising a series of displaceable measuring receptacles for the commodity, means for establishing a flow of the commodity in a duct, means for dividing the flow and guiding the divisions into separate receptacles of the series, means actuated by the aggregate weight of the received commodity for displacing said series, and means for automatically instituting simultaneous accumulation of the divided flow in other separate receptacles of said series upon such displacement.

Signed by me at Boston, Massachusetts this 16th day of July, 1931.

CHARLES P. WELLMAN.